United States Patent [19]
Doi et al.

[11] Patent Number: 5,040,455
[45] Date of Patent: Aug. 20, 1991

[54] VENTILATION DEVICE FOR AUTOMOBILES

[75] Inventors: Shigetoshi Doi, Iwakuni; Shinshi Kajimoto; Mitsutoshi Kuroiwa, both of Hiroshima, all of Japan

[73] Assignee: Mazda Motor Corporation, Hiroshima, Japan

[21] Appl. No.: 539,815

[22] Filed: Jun. 18, 1990

[30] Foreign Application Priority Data

Jun. 16, 1989 [JP] Japan .................................. 1-70629

[51] Int. Cl.⁵ .............................................. B60H 1/26
[52] U.S. Cl. .................................. 98/2.02; 98/2.18; 98/900
[58] Field of Search ................. 98/2.01, 2.02, 2.18, 98/900

[56] References Cited

U.S. PATENT DOCUMENTS 4,144,803 3/1979 Götz et al. ........................... 98/2.18
4,804,140 2/1989 Cantrell ........................... 98/2.02 X

FOREIGN PATENT DOCUMENTS 34911 2/1984 Japan .................................... 98/2.02
114108 7/1984 Japan .................................... 98/2.02
187613 8/1987 Japan .................................... 98/2.02

*Primary Examiner*—Harold Joyce
*Attorney, Agent, or Firm*—Fleit, Jacobson, Cohn, Price, Holman & Stern

[57] ABSTRACT

A solar powered ventilation device for a vehicle has a solar cell disposed on a car body and electrically connected to an electrically operated ventilation system, and a controller for detecting a predetermined temperature outside the car to electrically disconnect the ventilation system from the solar cell. The ventilation system is supplied with electric power from the solar cell, thereby ventilating or exhausting air from the vehicle interior only when the exterior temperature is higher than the predetermined temperature.

11 Claims, 2 Drawing Sheets

VENTILATION DEVICE FOR AUTOMOBILES

FIELD OF THE INVENTION

The present invention relates to a ventilation device for an automotive vehicle and, more particularly, to an automobile ventilation device which can prevent an increase in temperature within an automotive vehicle left in bright sun.

BACKGROUND OF THE INVENTION

The temperature within a vehicle parked for a long time in bright sun, particularly in summer, becomes very high, and in some cases above 100° C. The air conditioning system of such a parked vehicle takes a long time before achieving its cooling effect and, as such, the interior of the vehicle is quite inhospitable for the driver and passengers.

To ventilate a parked vehicle, various types of ventilation systems having solar operated Ventilation fans have been proposed in the prior art. One type of solar powered ventilation system is known from, for example, Japanese Patent Publication No. 59(1984)-51,451, entitled "Ventilation Device For Automotive Vehicle," issued on Dec. 14, 1984. This ventilation device, as is schematically illustrated in FIG. 1, has a ventilation fan e disposed in a duct with its air inlet f opening inside the vehicle a and its air outlet g opening outside the vehicle a. The ventilation fan e is connected in series to a solar cell h attached to a rear window glass b as a power source by a bimetal switch i disposed in the vehicle a. This bimetal switch i has a switching temperature set to a specific temperature. The ventilation fan e is, accordingly, automatically operated to discharge air within the vehicle when the temperature within the parked vehicle reaches the specific temperature, i.e., the switching temperature of the bimetal switch.

However, in such a known solar powered ventilation system, since the detection of specific fan actuation temperature is effected independently of the temperature outside the vehicle, the ventilation fan works in response to the temperature inside the vehicle only. Therefore, if the switching temperature of the bimetal switch is set lower than temperatures at which a driver or passengers feel comfortable in the vehicle, the ventilation fan will be actuated even in circumstances in which it is not necessary to ventilate the vehicle, because the temperature in the vehicle is higher than the specific temperature. Such a circumstance will often be present when the temperature inside the vehicle is higher than the specific temperature but the temperature outside the vehicle is too low for comfortable ventilation.

SUMMARY OF THE INVENTION

It is, therefore, a primary object of the invention to provide an automobile ventilation device which ventilates properly according to external temperatures and which operates only when ventilation is needed.

The above object of the present invention is achieved by providing a solar powered ventilation device for an automotive vehicle which has ventilation means including an electric motor operated ventilation fan operated by electric power to ventilate, or exhaust, air in the automotive vehicle. A solar cell, disposed on a body of the automotive vehicle, for example, a roof of the automotive vehicle, is electrically connected to the electric motor operated ventilation fan, and absorbs sunlight. The solar cell converts the radiation of the sunlight to electric power to be supplied to the electric motor operated ventilation fan. The electric motor operated ventilation fan is disconnected from the solar cell by and when control means detects a predetermined temperature outside the automotive vehicle.

The control means has a temperature sensor disposed close to an air outlet of a Ventilation duct of the ventilation means and switch means which switches on when the temperature sensor detects the predetermined temperature outside of the vehicle.

In one specific embodiment, the control means comprises an exterior thermostat switch, disposed close to the air outlet of the ventilation duct, connected in series between the ventilation fan and solar cell. The exterior thermostat switch switches itself on at a switching temperature set equal to the predetermined temperature outside the vehicle so as to electrically connect the solar cell to the electric motor operated ventilation fan, thereby supplying electric power to the motor operated Ventilation fan from the solar cell.

The control means preferably further includes an interior thermostat switch disposed inside the automotive vehicle and connected in series to the exterior thermostat switch. The interior thermostat switch has a switching temperature higher than the predetermined temperature at which the exterior thermostat switch switches itself off. The interior thermostat switch, when the temperature inside the vehicle reaches the switching temperature of the interior thermostat switch, switches itself off, cutting electric power to the motor operated ventilation fan from the solar cell.

Since the ventilation fan is operated only when the temperature outside the vehicle is higher than a particular switching temperature, which is set to a specific temperature, the ventilation device is set into action mostly when a vehicle is parked under the blazing sun in summer for a long time and the inside of the vehicle becomes too hot. However, in winter, since the inside of the vehicle does not becomes so hot, even when the vehicle is parked under the sun for a long time, and since the outside temperature may be too low for the vehicle to be comfortably ventilated, the ventilation device is not actuated. Accordingly, the inside of the parked vehicle is kept warm in winter.

BRIEF DESCRIPTION OF THE DRAWINGS

The above and other objects and features of the present invention will be apparent from the following description of a preferred embodiment thereof when considered in conjunction with the appended drawings, wherein same or similar parts are designated by the same reference numerals throughout the several drawings, and in which.

DETAILED DESCRIPTION OF THE PREFERRED EMBODIMENT

Figure 1:
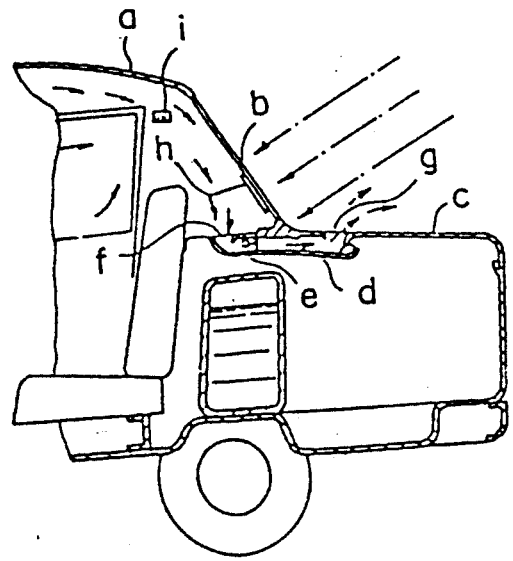
FIG. 1 is a cross-sectional view showing part of an automotive vehicle in which a prior art ventilation device is incorporated.
Figure 2:
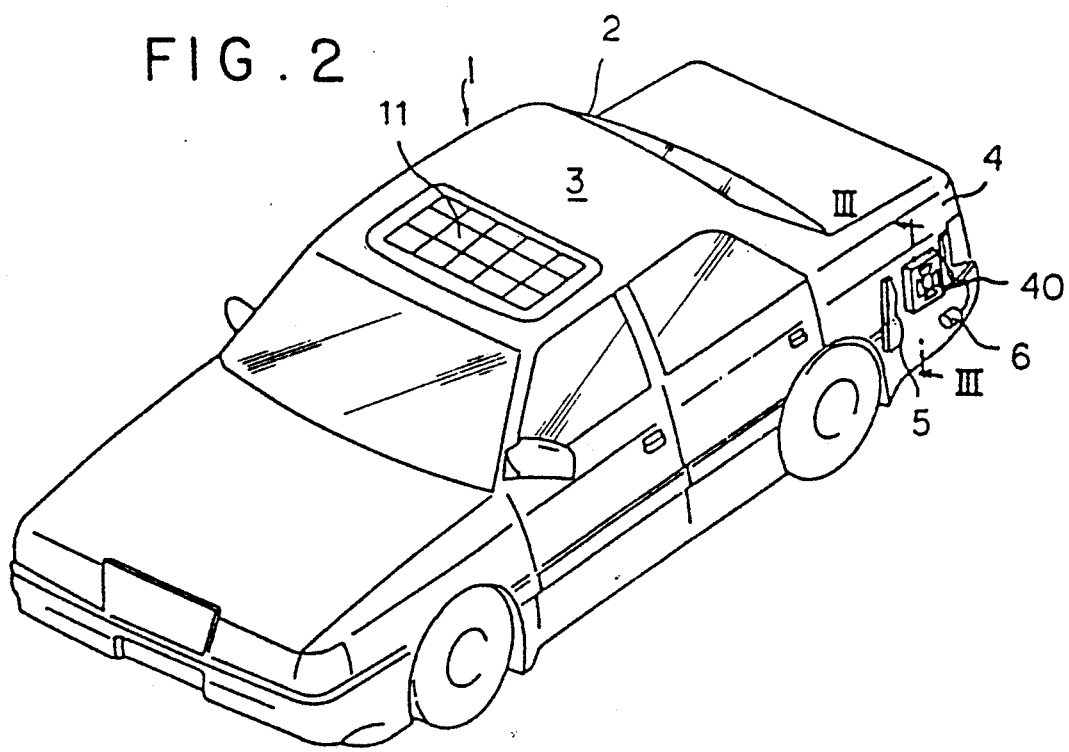
FIG. 2 is a schematic perspective view showing an automotive vehicle in which a ventilation device in accordance with a preferred embodiment of the present invention is incorporated.
Figure 3:
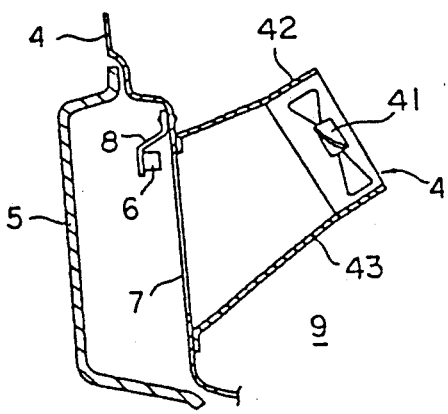
FIG. 3 is an explanatory, enlarged cross-sectional view as seen along line III—III of FIG. 2.
Figure 4:
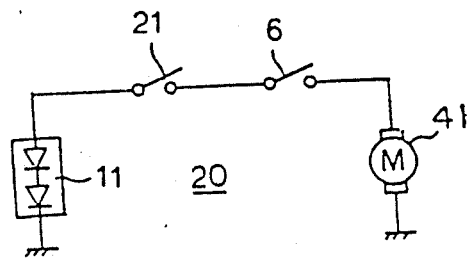
FIG. 4 is a diagram showing a driving circuit for the ventilation device shown in FIG. 2.

Referring to FIGS. 2 through 4, the present invention is embodied in a ventilation device incorporated in an automotive o vehicle 1. Car body 2 of the automotive vehicle 1 is provided with an electric motor operated ventilation fan 41 forming part of the ventilation device 40. The ventilation fan 41 is located inside part of a rear fender 4 of the car body 2 which is covered by a rear bumper 5. The ventilation device 40 includes an exterior thermostat switch 6, such as a bimetal switch, which closes to operate or switch on at a predetermined switching temperature, which is set to a specific exterior temperature, for example, about 35° C. (59° F.). The bimetal switch 6 is disposed inside the bumper 5 so as to detect the exterior temperature outside the vehicle 1. A panel of solar cells 11 is disposed on a roof 3 of the automotive vehicle. The solar cells 11, used as a power supply for the electric motor operated ventilation fan 41, absorb sunlight, converting the radiation to electric power.

As is shown in detail in FIG. 3, the lower part of the rear fender 4, covered by the bumper 5, is formed with an opening 7 as an air outlet from which an exhaust duct 43, tapering toward its inner end and inclining upwardly, extends substantially parallel to the center axis of rotation of the ventilation fan 41 in a trunk room or volume 9. This trunk room 9 communicates, in a known manner, with the inside of the automotive vehicle 1 for ventilation. The exhaust duct 43 is provided, at its inner end, with a cylindrical frame 42 for supporting therein the ventilation fan 41. The exterior thermostat switch 6 is held by a bracket 8 to front to, or face, the exhaust air outlet or opening 7 of exhaust duct 43 so as tO be exposed to exhaust air passed through the exhaust duct 43 when the fan 41 is actuated.

As is shown in FIG. 4, the electric motor operated ventilation fan 41 of the ventilation device 40 is controlled by control means or power supply control circuit 20, in which the ventilation fan 41 is connected in series to the solar cells 10 through the thermostat switch 6 and a main switch 21, connected in series to each other. The main switch 21, disposed inside the vehicle 1, may be either a manually operated switch, which is switched on when ventilation is wanted or expected, or of an automatically operated, normally closed switch. If main switch 21 is an automatically operated, normally closed switch, switch 21 is constructed as a thermostat switch which opens, or switches off, when the temperature inside the vehicle 1 reaches a desired, i.e., sufficiently cool, interior temperature, for example, about 20° C. (68° F.), at which the driver and/or passengers in the vehicle 1 feel comfortable.

If a manually operated switch for the main switch 21 is employed, it is desirable to adapt the exterior thermostat switch 6 to close, or switch on, at specific exterior temperature of, for example, about 15° C. (59° F.), to enable operation of the fan 41. It is also desirable to adapt the exterior thermostat switch 6 to open, or switch off, at a second switching temperature, i.e., a desired interior temperature, for example, about 20° C. (68° F.). It should again be noted that the interior temperature is detected by the exterior thermostat switch 6 as air from inside the vehicle is blown over the switch 6 by fan 41.

When the exterior thermostat switch 6 detects that the temperature of air outside the automotive vehicle 1 is equal to or greater than the specific exterior temperature, namely the lower switching temperature of the thermostat 6, switch 6 turns itself on, i.e., closes. When switch 6 is closed while the manually operated interior switch 21 is also switched on or closed, the power supply circuit 20 supplies electric power generated by the solar cells 11 to operate the ventilation fan 41 to operate the fan. As soon as the ventilation fan 41 begins its operation, it forces hot air inside the passenger chamber and trunk of the automotive vehicle 1 out through the exhaust duct 43, thereby ventilating the chamber and trunk so as to gradually lower the temperature inside the automotive vehicle 1. Because the exhaust air from the exhaust air outlet or opening 7 blows over the thermostat switch 6, the thermostat switch 6 is gradually cooled. When the automotive vehicle 1 is sufficiently ventilated and the temperature inside the automotive vehicle 1 passes below the lower specific or switching temperature of thermostat switch 6, the thermostat switch 6 opens, or switches off, to shut down the power supply circuit 20, so as to stop the ventilation fan 41.

The ambient temperature present around the thermostat switch 6 may rise higher than the specific temperature switching the thermostat switch 6, for example because of heat from an exhaust pipe of the engine after starting the engine of the automotive vehicle 1. If the ambient temperature around thermostat switch 6 rises higher than the specific temperature of switch 6, the ventilation device 40 is actuated independently from the temperature outside the automobile vehicle 1. However, as soon as the ventilation fan 41 operates, it blows off the heated air surrounding the thermostat switch 6, so that the thermostat switch 6 can detect the actual external temperature outside the automobile vehicle 1 soon after the engine starts.

As long as the interior switch 21 is open, or switched off, either manually, or automatically when the switch 21 detects an interior temperature which is lower than the specific temperature which closes the main switch 21, the ventilation fan 41 is not actuated, even though the thermostat switch 6 has detected the specific exterior temperature and is closed to switch or turn itself on.

When the temperature outside the automobile vehicle 1 is lower than the specific temperature which causes switch 6 to close, the thermostat switch 6 is maintained open or off, so that no ventilation takes place even though the temperature inside the automotive vehicle 1 is high. It is considered that when the temperature of air outside the automobile vehicle 1 is lower than the specific temperature, the temperature of air inside the automotive vehicle 1 will not rise so high as to give discomfort to the passengers in the automotive vehicle 1. Accordingly, no ventilation is required. This results in eliminating operation of the ventilation device 40 when no ventilation is required. It should be noted that arranging the exhaust duct 43 inside the rear bumper 5 prevents hot exhaust air from the interior of the vehicle from blowing on persons standing near the rear of the automotive vehicle 1.

Figure 5:
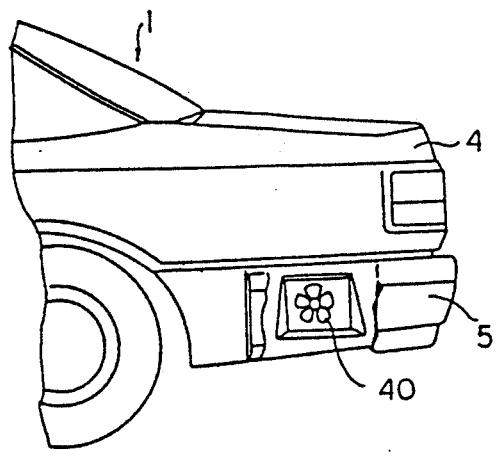
FIG. 5 is a schematic side view showing an automotive vehicle, partly cut away, in which a ventilation device in accordance with another preferred embodiment of the present invention is incorporated.
Figure 6:
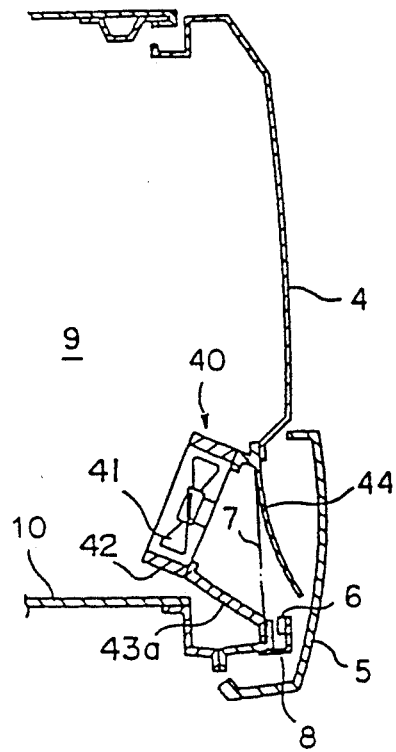
FIG. 6 is an explanatory, enlarged cross-sectional view of the ventilation device shown in FIG. 5.

Referring to FIGS. 5 and 6, showing the ventilation device according to another preferred embodiment of the present invention, an exhaust duct 43a, which is similar in function to but different in structure from the exhaust duct 43 of the previous embodiment, is disposed near a floor panel 10 of the trunk and extends from the cylindrical frame 42 at an angle smaller than a right angle with respect to the center axis of rotation of the ventilation fan 41. The exhaust duct 43a is further shaped at its end connected to the air outlet opening 7 to be elliptical so as to locate the front periphery of upper portion of the cylindrical frame 42 close to the inner surface of the rear fender 4. The elliptical end of the exhaust duct 43 is provided with a guide plate 44 at its upper portion to direct exhaust air forced by the ventilation fan 41 downwardly and outward. Such an arrangement of the exhaust duct 43a and guide panel 44 provides additional help in preventing exhaust air from blowing on persons standing near the rear of the automotive vehicle 1.

The electric motor operated ventilation fan 41 of the ventilation device 40 of this embodiment is also controlled by the same control means or power supply circuit 20 as shown in FIG. 4.

If it is desired, the passenger chamber of the automotive vehicle 1 may be directly connected to the ventilation device 40, in particular the ventilation fan 41, by way of a duct so as to exhaust air only in the passenger chamber rather than in both the passenger chamber and trunk room.

It is to be understood that although the invention has been fully described in detail with respect to a preferred embodiment thereof, nevertheless, various other embodiments and variations are possible which are within the spirit and scope of the invention, and such embodiments and variations are intended to be covered by the following claims.

What is claimed is:

1. A solar powered ventilation device for an automotive vehicle having a ventilation duct with an air outlet facing outside of said automotive vehicle, comprising:
    ventilation means operated by electric power for exhausting air in said automotive vehicle through said air outlet;
    a solar cell, disposed on said automotive vehicle and electrically connected to motor means, for absorbing sunlight and converting radiation of absorbed sunlight to said electric power, said electric power being supplied to said motor means for operating said ventilation means; and
    control means for detecting a specific, predetermined temperature outside said automotive vehicle to electrically connect said motor means to said solar cell and supply said electric power to said motor means and operate said ventilation means.

2. A ventilation device as defined in claim 1, wherein said ventilation means includes a motor operated fan disposed in said ventilation duct.

3. A ventilation device as defined in claim 1, wherein said control means comprises a temperature sensor disposed close to said air outlet of said ventilation duct and switch means for closing and switching on when said temperature sensor detects said specific, predetermined temperature outside said automotive vehicle.

4. A ventilation device as defined in claim 1, wherein said control means comprises a first, exterior thermostat switch connected in series between said ventilation means and said solar cell for closing and switching itself on at a switching temperature equal to said specific, predetermined temperature to supply said electric power to said ventilation means from said solar cell.

5. A ventilation device as defined in claim 4, wherein said first exterior thermostat switch is disposed close to said air outlet of said ventilation duct outside said automotive vehicle.

6. A ventilation device as defined in claim 5, said control means further comprising a second thermostat switch disposed inside said automotive vehicle and connected in series to said first exterior thermostat switch, said second thermostat switch switching itself off at a switching temperature higher than said specific, predetermined temperature to cut off electric power supplied to said motor operated ventilation means from said solar cell.

7. A ventilation device as defined in claim 5, wherein said control means further comprises a manually operable, normally open switch disposed in said automotive vehicle and connected in series to said exterior thermostat switch, said manually operable, normally open switch being closed when ventilation is expected.

8. A ventilation device as defined in claim 1, wherein said control means comprises an exterior thermostat switch connected in series between said ventilation means and said solar cell, said exterior thermostat switch switching itself on at a first switching temperature equal to said specific temperature to supply electric power to said ventilation means from said solar cell and switching itself off at a second switching temperature higher than said first switching temperature to disconnect said electric power.

9. A ventilation device as defined in claim 8, wherein said exterior thermostat switch is disposed close to said air outlet of said ventilation duct.

10. A ventilation device as defined in claim 8, wherein said control means further comprises a manually operable, normally open switch disposed in said automotive vehicle and connected in series to said exterior thermostat switch, said manually operable, normally open switch being closed when ventilation is expected.

11. A ventilation device as defined in claim 8, wherein said exterior thermostat switch has a first switching temperature about 15° C. and a second switching temperature of about 20° C.

* * * * *